Jan. 9, 1968 A. RODDA 3,362,771

MULTI-PURPOSE SOUND-ON-FILM AND/OR TAPE MOTION PICTURE PROJECTOR

Filed May 12, 1965 2 Sheets-Sheet 1

INVENTOR
ALBERT RODDA

BY Claude Funkhouser ATTORNEY

Thomas H. Webb AGENT

Jan. 9, 1968 A. RODDA 3,362,771

MULTI-PURPOSE SOUND-ON-FILM AND/OR TAPE MOTION PICTURE PROJECTOR

Filed May 12, 1965 2 Sheets-Sheet 2

United States Patent Office 3,362,771

Patented Jan. 9, 1968

3,362,771

MULTI-PURPOSE SOUND-ON-FILM AND/OR TAPE MOTION PICTURE PROJECTOR

Albert Rodda, Alexandria, Va., assignor to the United States of America as represented by the Secretary of the Navy Filed May 12, 1965, Ser. No. 455,350
4 Claims. (Cl. 352—5)

ABSTRACT OF THE DISCLOSURE

The invention provides a method and apparatus whereby lip synchronization between a picture film and a magnetic sound tape is accurately maintained.

The invention described herein may be manufactured and used by or for the Government of the United States of America for governmental purposes without the payment of any royalties thereon or therefor.

This invention relates to a novel method and apparatus for providing playback of magnetically recorded sound intelligence on a sound-on-film motion picture projector particularly of the portable 16 mm. type, although the invention is not necessarily limited thereto. More particularly the invention is directed to techniques for providing lip synchronization playback of a sound track not incorporated in the film carrying the visual or light projected portion of the picture intelligence with a single projector.

The apparatus required to carry out the practice of the instant invention is particularly well-adapted for incorporation in projectors incorporating sound head units of the character disclosed in U.S. Patent No. 2,836,423 which issued to E. W. D'Arcy et al. The modifications required for practicing the invention may with similar feasibility be incorporated in 16 mm. projectors of the character shown in U.S. Patent Nos. 2,678,357 and 2,730,571 which issued to F. J. Schuessler. The method of this invention is also well-adapted for practice with 16 mm. sound-on-film projectors of the optical sound-on-film type, as well as others having similar or suitable threading arrangements, when the same are converted by the addition of magnetic sound playback and/or record/playback heads disposed preferably in adjacency to the stabilizing capstan roller and/or fly wheel assembly. Suitable conversion assemblies for the addition of magnetic strip type sound-on-film playback and/or record facilities for certain of the aforementioned projectors are manufactured. Conversion assemblies for projectors having facilities only for projection of optical sound-on-film movies incorporating sound heads of the character disclosed in U.S. Patent No. 2,617,892 to J. S. Powers et al. are available. This conversion assembly is similar to the structure disclosed in the aforementioned D'Arcy et al. patent.

The changes incorporated in a projector of any of the aforementioned types for practice of the instant inventive concept in no way adversely affect the use of such projectors for any of the originally intended purposes of projecting optical sound-on-film type motion pictures or silent type pictures including the same with an added magnetic oxide strip in adjacency to the optical sound track or in super imposed relationship thereto as taught by U.S. Patent No. 2,950,971 which issued to G. Lewin for purposes of adding sound thereto during operation of the projector.

The instant invention is directed to the utilization of an optical picture projection system in a conventional manner. Typical systems have an intermittant motion type film drive such as a pull-down claw for advancing the film across the light beam in a manner well-known in the art. The pull-down drive is interposed between a pair of sprocketed drive elements which are driven at a constant speed of 24 frames per second for sound type film. The sound head portion of the projector is utilized without any modification of the structure thereof on some types of projectors. Accordingly, the apparatus conversion elements required for the novel film and magnetic tape handling arrangement of the invention are directed primarily to facilities for handling an additional pair of film reels, together with the necessary guide rollers for directing a sprocketed magnetic tape as fed from a supply reel into, through and out from the sound head portion of the projector and thence onto the tape take-up spool or reel.

Prior art methods for projecting a film presentation with a film not provided with a sound track thereon have necessitated the use of either a magnetic tape recorder with playback facilities operated in exact synchronism with the motion picture projector, or alternatively, some other separate sound reproduction apparatus. In instances wherein it is deemed desirable to use sprocketed magnetic tape, as an aid in establishing synchronization by cueing techniques, a second projector is required. If precise lip synchronization is desired, it is necessary to synchronize the drive motors of the two projectors in order to maintain a constant speed relationship between the film and sound tape in the respective ones of the two projectors. Synchronization equipment for the aforementioned purpose is known in the art, but such equipment is expensive, somewhat bulky and cumbersome for use, particularly in instances where portability of the projection equipment is an important or prime consideration with respect to the most advantageous use of the projector.

In distinction from the foregoing systems of the prior art, the instant system provides for the accomplishment of the same end result with a minimal number of additional parts. The only additional elements of significant size are two additional reels and one additional reel arm support and spindle assembly. This support arm assembly is substantially identical to the supply reel arm support assembly utilized with the projector for its normally intended mode of operation. The original supply reel arm support may advantageously be utilized without modification by the mere operation of installing it at a new location at the rear of the projector when utilized for the practice of the instant invention. The modifications incorporated in the structure of the other two reel arm supports will become more apparent from the accompanying drawings and the following description.

It is a feature of the instant invention to provide a new and novel method of operation of a conventional type portable 16 mm. sound-on-film motion picture projector with a ribbon or tape medium of the character having a magnetic oxide coating for playback of magnetically recorded sound intelligence, which tape is of a nature wherein it is provided with conventional sprocket holes of the same character and spacing as those provided in the film medium.

One object of the instant invention resides in the provision of apparatus for the modification of conventional 16 mm. portable sound on film type motion picture projectors of a character having provisions for sound reproduction of magnetically recorded film by the utilization of a separate magnetic sound tape and accomplishing the same with a minimal modification of the projector and in a manner whereby normal operation of the projector for its initially intended purpose is not adversely affected.

Another object of the instant invention resides in the provision of a film and sound on tape projection system for motion pictures whereby accurate lip synchronization between the film medium and the magnetic sound tape medium is accurately maintained at all times after initial synchronization is established prior to operation of the system as by well-known cueing techniques.

It is also an object of the instant invention to provide a method and system for carrying out the foregoing objects which is inexpensive to install and use and which requires no additional skill on the part of the operator of a projector in practicing the novel method of the invention.

An additional object of the instant invention is to provide a foolproof method of establishing lip synchronized performance with separate sound and film mediums which maintains accurate synchronization after the initial establishment thereof.

Other objects, advantages and novel features of the instant invention will become apparent from the following detailed description of the invention when considered in conjunction with the accompanying drawings wherein.

Figure 4:
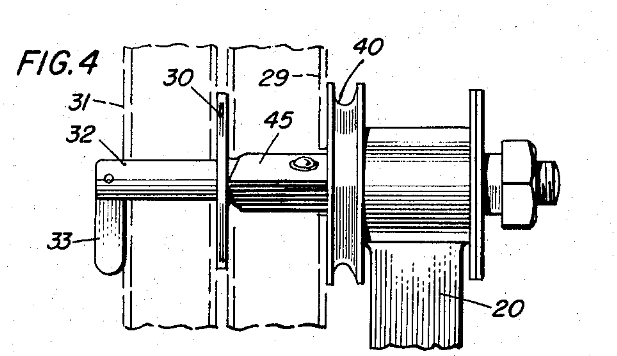
Figure 5:
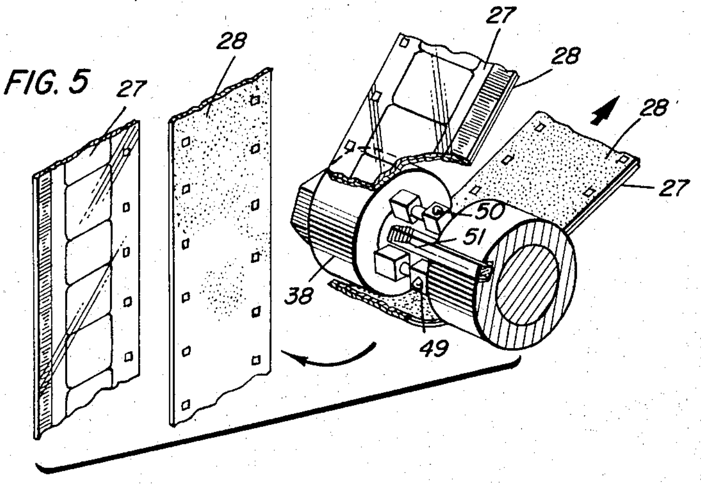

FIG. 4 is a plan view of a modified spindle assembly as utilized for retention of both a film supply reel and a magnetic tape supply reel; and FIG. 5 is a fragmentary pictorial view of details of the sound head structure of a conventional projector and further illustrating the relationship of the normal sound track portion of a motion picture film and the preferred location of the magnetic sound track portion of the perforated magnetic tape together with a showing of the relative positions of these respective mediums as they are fed through the sound head portion of the projector.

Figure 1:
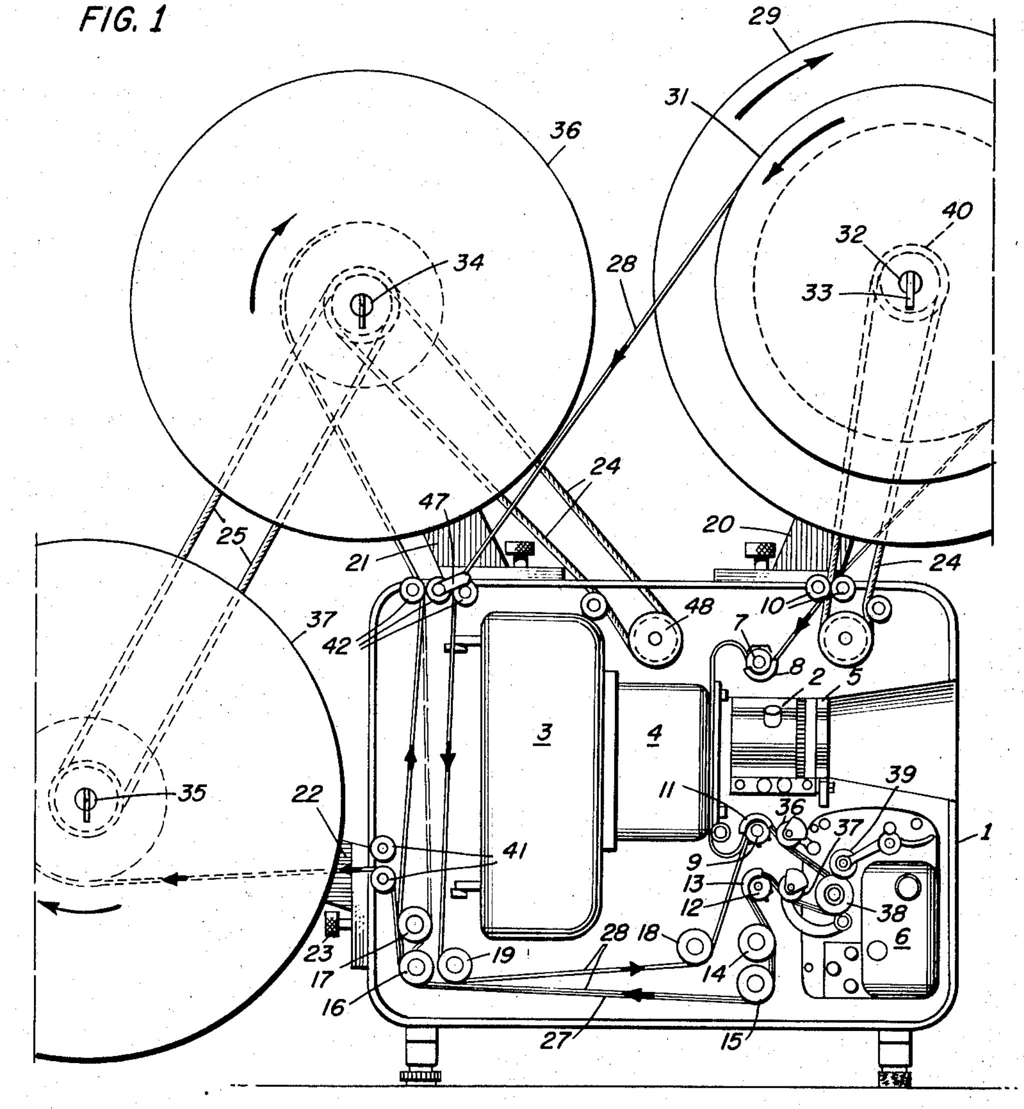
FIG. 1 is an elevation view of a 16 mm. sound-on-film motion picture projector of a preferred embodiment of the invention and incorporating the structural conversion elements for practicing the instant invention.
Figure 2:
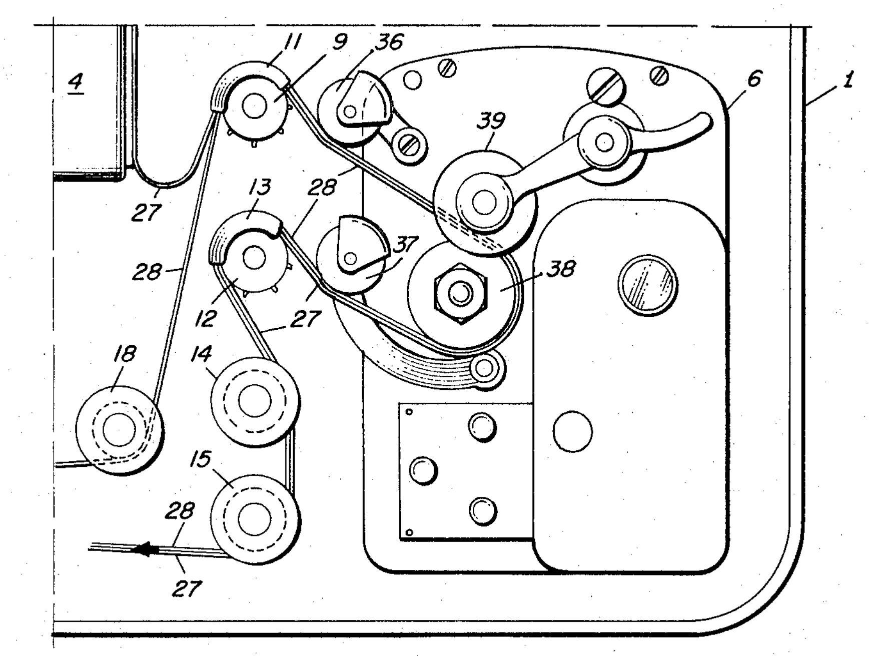
FIG. 2 is a fragmentary elevation view at an enlarged scale of a portion of FIG. 1 illustrating the manner of threading a film and a magnetic tape over the sound head portion of a projector.

Referring now to the drawings and more particularly to FIG. 1, a preferred embodiment of the instant invention is shown as incorporated with structure of a conventional 16 mm. portable motion picture projector. The projector is shown generally at 1 and is of a character incorporating a lens mount at 2, a lamp housing assembly at 3, and a condensing lens and shutter housing at 4 for projection of a light beam through the projection lens 5 in conventional manner. The film to be projected is introduced into the drive mechanism of the projector by threading it between guide rollers 10 at the top edge of the projector housing. It is then fed under an upper drive sprocket 7 where it is latched and retained in engagement with the sprocket teeth of the feed sprocket 7 by a guide and latch element 8. The film is formed into an upper loop and passed down through the film gate and projection aperture, not shown, which is incorporated in the housing portion 4 where it is driven by a pull-down tooth, also not shown, and fed therefrom in the form of a lower loop which is located to immediately precede the engagement thereof by the lower drive sprocket 9. The film is latched in position against the sprocket 9 by a guide and latch element 11. The film is then fed into the sound head portion of the projector indicated generally at 6 and upon its exit from the sound head portion is fed over a third drive sprocket 12 having a sprocket guide and latch element 13 for retention of the film in the sprocket teeth of the sprocket roller 12. The film is then fed around guide rollers 14, 15, 16 in a conventional manner. In normal operation of a projector utilizing film having an integral sound track, the film is fed around the right hand side of roller 17 and follows the path shown in dashed outline upwardly and out between the center and left hand guide rollers 42 at the upper edge portion of the projector. These two guide rollers 42 are incorporated in the unconverted version of a projector. Before proceeding with the description as it relates to a converted projector, attention is directed to the fact that the foregoing description of the film path and the relationship thereof with the procedure for threading the projector is directed to the normal or conventional manner of usage of the projector.

The adaptation of the mechanism of the projector for the conversion thereof to enable the practice of the instant invention requires only the incorporation of one additional guide roller 42, a retention turn button type latch 47 and two pairs of additional guide rollers 18, 19 and 41 insofar as the mechanisms enclosed within and/or disposed at the periphery of the projector case are concerned. Slight external modifications are incorporated to enable the handling of the additional tape spools.

Figure 3:
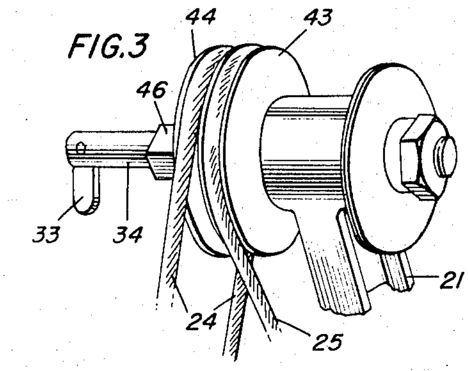
FIG. 3 is a fragmentary perspective view of the dual belt and pulley assembly structure as utilized with the tape take-up reel spindle and support arm assembly according to a preferred embodiment the conversion equipment required for practice of the instant invention.

The feed spool for the film is carried by a conventional type spindle support 20 having modification incorporated therein as shown in FIG. 4 of the drawings. The spindle shaft 32 is of increased length to permit the reception of both a spool 29 for the film and a reel 31 for supply of the magnetic tape with sprocket receiving perforations therein. The spindle 32 carries a fiber spacer washer indicated at 30. It is to be noted that the outboard end of the spindle 32 is of cylindrical configuration thereby permitting free rotation of the spool 31 in a direction counter to the direction of rotation of the reel 29, which may, if desired, be driven by the belt 24 during projection operation by virtue of the squared portion 45 of shaft 32. The spindle and support assembly 21, shown in FIG. 1 as disposed in the position normally used for the film take-up reel, is substantially similar to the take-up spindle assembly used for conventional operation of the projector. The two supports 20 and 21 are retained in their properly aligned positions on the top of the projector by captive type knurled retaining knobs 23. The details by which this spindle differs from the conventional spindle are indicated in FIG. 3. This difference resides in a modification such that the spindle shaft 34, which carries the normal outboard shaft and locking arrangement shown for purposes of illustration as a turn latch 33, utilizes an additional pulley 44 to form a dual pulley assembly 43, 44 in lieu of the single pulley 43 normally incorporated on the spindle of this type of projector. This modification may be accomplished by the addition of a single pulley 44 having a square central bore for engagement of the squared portion 46 of the spindle shaft 34 normally utilized for driving of the conventional type reel. This pulley is installed when the projector is used for the purpose of this invention. It may be removed for normal operation of the projector.

The projector modification further incorporates the use of an additional spindle support assembly 22 which is retained in its operative position at the lower rear portion of the projector by modification of the projector housing to receive a dowel pin, not shown, but normally incorporated in the spindle support base and a similar captive knurled retaining thumb screw 23. The spindle support assembly 22 for the spindle shaft 35, as utilized for take-up of the film on the film take-up reel 37, is for all practical purposes identical to the support arm normally utilized as the supply reel on an unconverted projector. Accordingly, it is considered to be apparent that the use of an additional film and tape supply reel arm of spindle support, modified as taught by FIG. 4 and a modification of the take-up reel spindle support 21 in any desired manner to incorporate an additional single pulley 44 or a dual pulley 43, 44 are the only substantial modifications required as to the external portion of the projector. It is to be understood that an additional belt 25 is provided in order to drive the spindle 35 from the spindle 34 which in turn is driven by belt 24 from the pre-existing drive pulley 48 of the projector.

Referring now to FIG. 4 of the drawings, the spindle support 20 is similar in all major structural aspects to a conventional spindle support assembly 22 with the sole exception being that the normal length spindle is replaced by a spindle 32 having the cylindrical portion of the shaft elongated by an amount sufficient to provide for reception and retention of two reels 31 and 29 together with an intermediately disposed fiber washer 40 which is inserted between the two reels at the time of placement of the reels on the spindle 32. The spacer washer 40 is provided in order to better facilitate operation of the projector with respect to the counter-rotation of the reel carrying the sprocket holed magnetic tape. The curved arrows in FIG. 1 of the drawing indicate the preferred direction of rotation of the two supply reels wherein the spool 29 rotates in a clockwise direction, when considered by one facing the projector whereas the tape spool 31 rotates in the counterclockwise direction. The slight lateral displacement of the magnetic tape with respect to the position of the guide roller 42 is inconsequential.

In the practice of the method of the instant invention, film spools 29 and 37 are placed on the respective support arms 20 and 22 as illustrated in FIG. 1. Empty reel 36 is placed on spindle 34 with the square holed side matingly engaging the squared portion 46 of this shaft 34. The spacer washer 40 is positioned on spindle or shaft 32 against reel 29. Thereafter, the tape spool or reel 31 is placed on spindle 32 and turn button latch 33 moved to the position shown in FIG. 4 to retain the reels on the spindle. The threading of the film 27 is substantially the same as that hereinbefore set forth with the exception that the film is threaded to feed out of the projector between the guide rollers 41. The film is then attached to the take-up reel 37. The magnetic tape is threaded in the direction shown by the arrow through the center and right hand guide rollers 42, thence, downwardly around roller 19, generally horizontally around roller 18 and upwardly to sprocket 9. The tape 28 is then threaded under the film at sprocket 9 by releasing the latch 11 and inserting the tape under the film. It is then passed under the stabilizing roller 36 also in underposed relationship with the film 27 in a manner indicated in FIG. 5. The threading around the capstan 38 is such that the film and tape pass capstan pinch roller 39, around the capstan 38, outwardly under stabilizing roller 37, thence, over the film as the film and tape enter the drive sprocket 12. This entry to sprocket 12 is accomplished by raising the latch 13 to permit engagement of the sprocket holes in the film and tape with the sprocket teeth as the two different mediums pass thereover and thereafter closing the latch 13. This engaging of the film and tape by the teeth of the sprockets 9 and 12 establishes synchronism between the tape and film. The tape is disposed under the film as these two mediums pass around guide rollers 14, 15 and 16. Prior to engagement of the tape by the guide roller 17, the film 27 and tape 28 separate to follow differing paths to their respective take-up reels 37 and 36. The tape 28 is threaded upwardly through the center and left hand guide rollers 42 and onto the aforementioned reel 36 carried by the shaft 34. The film passes out through the guide rollers 41 in the manner previously stated. While the threading path of the film and tape as described is identical to that of the projector in operation, it has been set forth in the foregoing manner for purposes of clarity in presentation.

It is to be understood, however, that a projectionist skilled in the art to which this invention pertains would in all probability thread the film leader down to the position for the lower film loop, close and secure the film gate, not shown, make an allowance for the loop in advance of or possibly temporarily retain it, at sprocket 9 with latch 11 in its open position, stop at this point, thread the tape 28 around to the drive sprocket 9 and thereafter mate the two mediums according to previously established cue marks. The cue marks may be merely marks on the edges or faces of the film and tape, for example, as applied by a china marking crayon or suitable paint or by notching the edges or perforating the face portions of the leaders of the two mediums. The two leader strips would then be laid in their mating position and formed into an open loop before being passed under the upper and lower stabilizing roller elements 36 and 37 associated with the sound head portion 6 of the projector. The excessive slack in the loop would be taken-up as the film and tape pass around the sound head capstan 38, by inserting the leaders over sprocket teeth of the lower sprocket 12. Thereafter they would be passed over the aforementioned guide rollers in unison up to the point of separation of the two mediums at the guide roller 16. The remaining portion of the threading operation would be as aforedescribed. After the aforementioned predetermined synchronization relationship has been established, or one or more test startings of the project made to determine any required shifting of the tape with respect to the film to provide for an initial establishment and marking for lip synchronization, if desired, of the magnetic tape medium with the corresponding picture subject matter carried by the images on the film, the projector drive may be placed in operation or reversed to back the film and tape to their respective starting positions as the case may be. In the latter instance the drive motor is switched to the normal or forward position thereof. Thereafter, a movie presentation is made in a conventional manner. The instant invention is not concerned with the technique utilized in rewinding the films after the presentation has been made. This operation may be performed by demounting the several reels and accomplishing rewinding on a conventional bench mounted type rewind assembly. This does not mean that the rewinding cannot be accomplished on the projector by the sequential operation of transposing the respective reels to be handled in the rewinding operation in a manner deemed to be obvious to a skilled projectionist. The film take-up reel must be transposed onto the top of the projector and mounted on the spindle 34 carried by spindle support 21. The tape reel 37 may be rewound directly from this reel. However, the tape feed reel 31 upon which the tape 28 is to be rewound must be placed in the position normally occupied by reel 29 in order that the drive arrangement provided by the squared portion 45 of the shaft 32 adjacent the drive pulley 40 will drivingly engage the reel during the rewind operation.

Referring now to FIG. 5, certain of the detailed relationships of the optical and magnetic sound transducer elements are illustrated in a manner considered to provide additional clarity to a full understanding of the instant invention. The prism 51 which is utilized for playback of optical sound-on-film forms no part of the instant invention. It is entirely conventional. The showing thereof does, however, serve to indicate the relative positions normally occupied by this prism, the erase head 50 and record/playback head 49. The magnetic heads are normally used for magnet sound strip applications. However, the tape used with the instant invention may have sound intelligence recorded thereon when a projector having facilities for recording on the tape 28 is utilized with a dual function record/playback magnetic head which is disposed as illustrated at 49. The aforementioned transducers are all disposed adjacent the inboard end of the capstan roller 38. The pinch roller 39 is not shown in FIG. 5 since this device is an optical refinement not always found on commercial sound-on-film projectors.

It is further to be understood that the instant invention, while being described with respect to a 16 mm. projector, is equally applicable to magnetic sound-on-film type projectors of 8 mm. or 35 mm. film sizes. Additionally, it may, if desired, be utilized with European 9½ mm. projectors by suitable design arrangements of the structure thereof to facilitate a similar threading arrangement for the film 27 and magnetic tape 28.

Obviously many modifications and variations of the present invention are possible in the light of the above teachings. It is therefore to be understood that within the scope of the appended claims the invention may be practiced otherwise than as specifically described.

What is claimed is:

1. In a sound motion picture projector of the character incorporating an optical and/or magnetic sound playback head, the method of providing contemporaneous projection of an optical image carried by a film medium and a playback of sound carried by a magnetic tape medium, the steps which comprise:

feeding a film through an optical head portion of a projector;

guiding and feeding a separate magnetic tape medium along a path separate from that of the film medium as it is fed through the optical head to a point adjacent the sound head of the projector; and uniting the paths of both the film and magnetic sound tape mediums wherein the mediums are in mutually aligned contacting relationship as the same pass over the playback portion of the magnetic sound head, thereafter separating the film and magnetic tape medium to feed the respective mediums along separate paths for reeling or other disposal thereof externally of the projector.

2. The method of claim 1 wherein:

the magnetic tape medium may or may not have sound intelligence thereon;

the further step of recording sound intelligenece in situ with the projector, thereafter providing playback of the sound intelligence by the subsequent application of the steps of claim 1.

3. A conversion system for a conventional sound-on-film motion picture projector of a character adapted to provide playback of magnetically recorded sound intelligence as presented by a magnetic oxide medium caused to pass over the sound playback head thereof which comprises:

means for feed spooling and take-up reeling of two separate intelligence mediums externally of the projector; and means within the projector for guiding said mediums along separate and distinct paths upon entrance to the projector and thereafter uniting the respective paths prior to their passage over the sound head.

4. In combination with a magnetic sound motion picture projector of the character described:

means for feed and take-up reeling of a magnetic recording tape of a character having sprocket holes therein of the character utilized with positive cinematographic projection film;

means for guiding the tape along an initial path in the projector separate from the path of the film utilized therein as the picture portion of the film is projected;

means for combining the path of the film and magnetic tape as the same pass over the sound transducing portion of the projector; and means for separating the unified path of the film and magnetic tape for separate take-up reeling thereof.

References Cited

UNITED STATES PATENTS

| | | | |
|---|---|---|---|
| Re. 18,108 | 6/1931 | De Forest | 352—1 X |
| 1,888,910 | 11/1932 | De Forest | 352—1 X |

FOREIGN PATENTS

| | | |
|---|---|---|
| 722,251 | 12/1931 | France. |

JULIA E. COINER, *Primary Examiner.*